United States Patent [19]

Rohm et al.

[11] 4,337,865
[45] Jul. 6, 1982

[54] FEEDER MECHANISM FOR CONTROLLING DELIVERY OF FRUIT TO A JUICE EXTRACTOR

[75] Inventors: Robert F. Rohm, Yorba Linda; Olav Berge, Monterey Park, both of Calif.

[73] Assignee: Brown International Corporation, Covina, Calif.

[21] Appl. No.: 185,331

[22] Filed: Sep. 8, 1980

[51] Int. Cl.³ .............................................. B07C 5/06
[52] U.S. Cl. .................................. 209/548; 99/507; 209/627; 209/662
[58] Field of Search .............. 209/548, 625, 627, 632, 209/654, 659, 660, 662; 99/507

[56] References Cited

U.S. PATENT DOCUMENTS

| | | | |
|---|---|---|---|
| 562,625 | 6/1896 | Landis | 209/662 X |
| 2,370,262 | 2/1945 | Sandmeyer | 209/627 |
| 3,004,663 | 10/1961 | Creoglio | 209/654 |
| 3,858,500 | 1/1975 | Rohm et al. | 99/507 X |

FOREIGN PATENT DOCUMENTS 2202974  8/1973  Fed. Rep. of Germany ...... 209/632

*Primary Examiner*—Joseph J. Rolla
*Assistant Examiner*—Edward M. Wacyra
*Attorney, Agent, or Firm*—Paul A. Weilein

[57] ABSTRACT

A feeder mechanism for controlling delivery of fruits to a processing apparatus such as a juice extractor and wherein the delivered fruits must be of a size equal to or less than a predetermined size, and in particular where the fruits from the feeder are to be delivered to a hopper of the rotary type having magazines or other restrictive passages through which the fruits must pass en route to the processing apparatus, the feeder mechanism being arranged to provide a gating roll for limiting the maximum size of fruit admitted from a supply source to a feed path which contains an adjustable discharge opening for limiting the minimum size of fruit to be fed to the processing apparatus and also discharge unwanted foreign objects, the feed path at its delivery end having a feed roll for moving fruits which are within the predetermined maximum and minimum size limitations from the feed path to a delivery path, and in the case of delivery to a hopper having a control for sensing the fruit level in the hopper, and being operable in response to an increase of the fruit level above a predetermined normal to stop the operation of the gating and feed rolls, until a normal fruit level in the hopper is again established.

24 Claims, 7 Drawing Figures

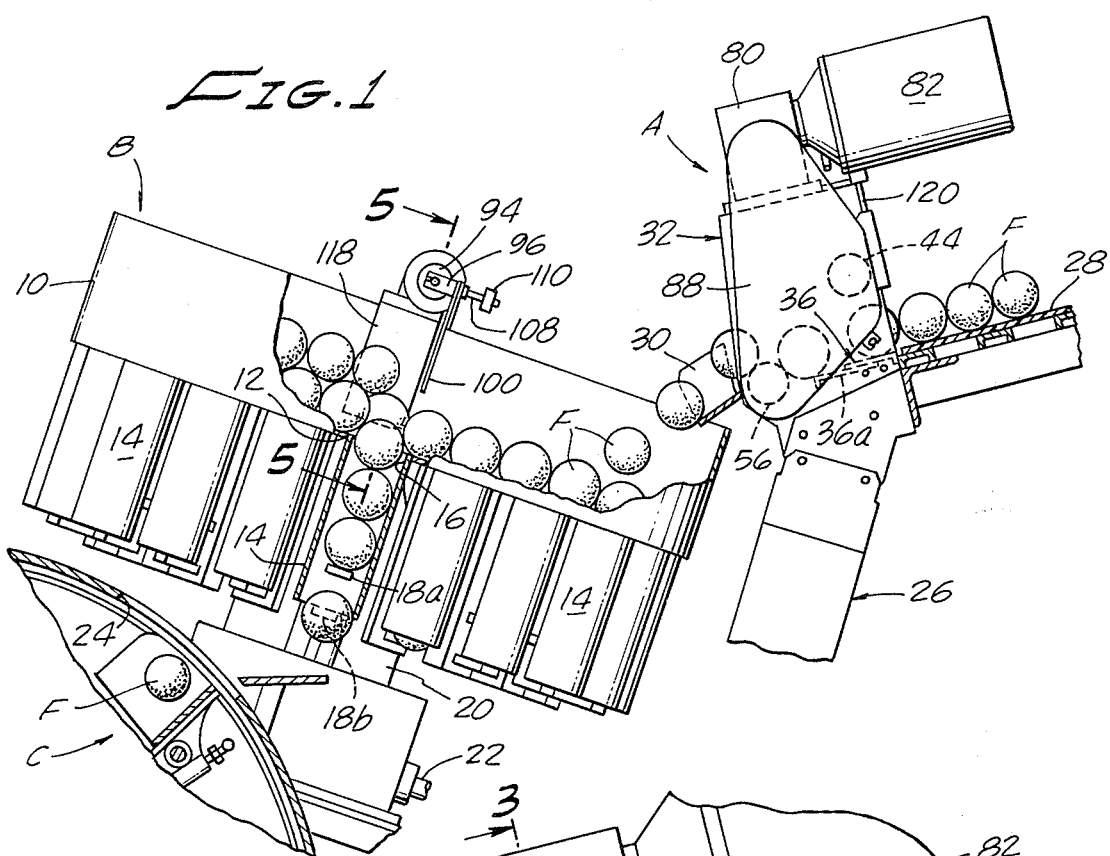
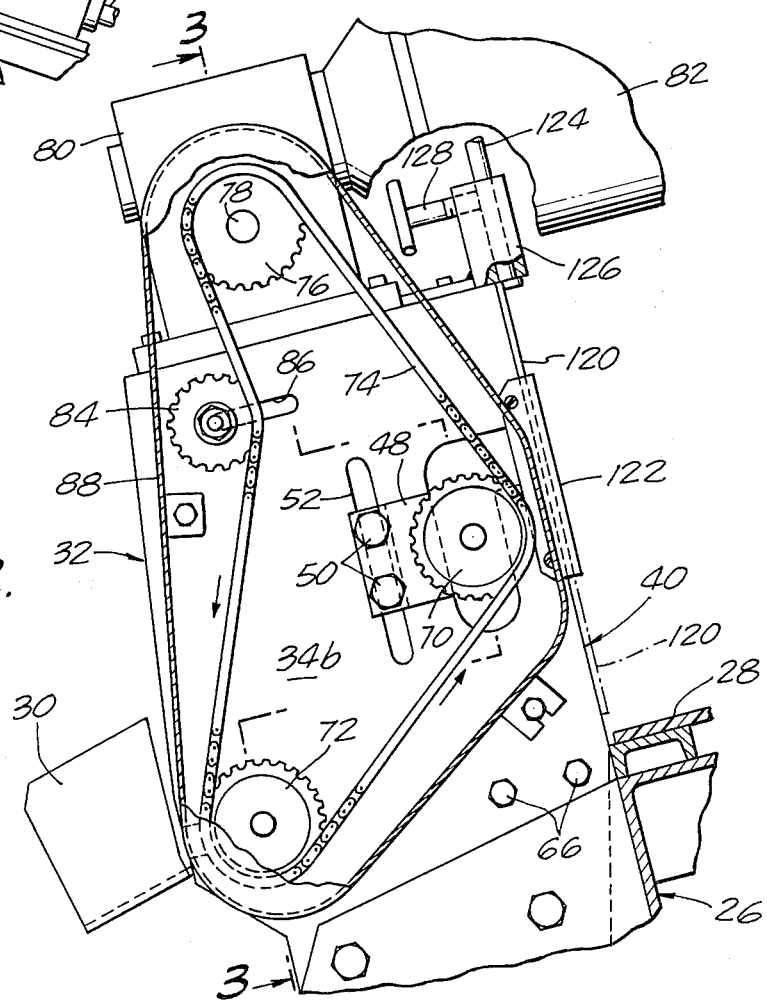

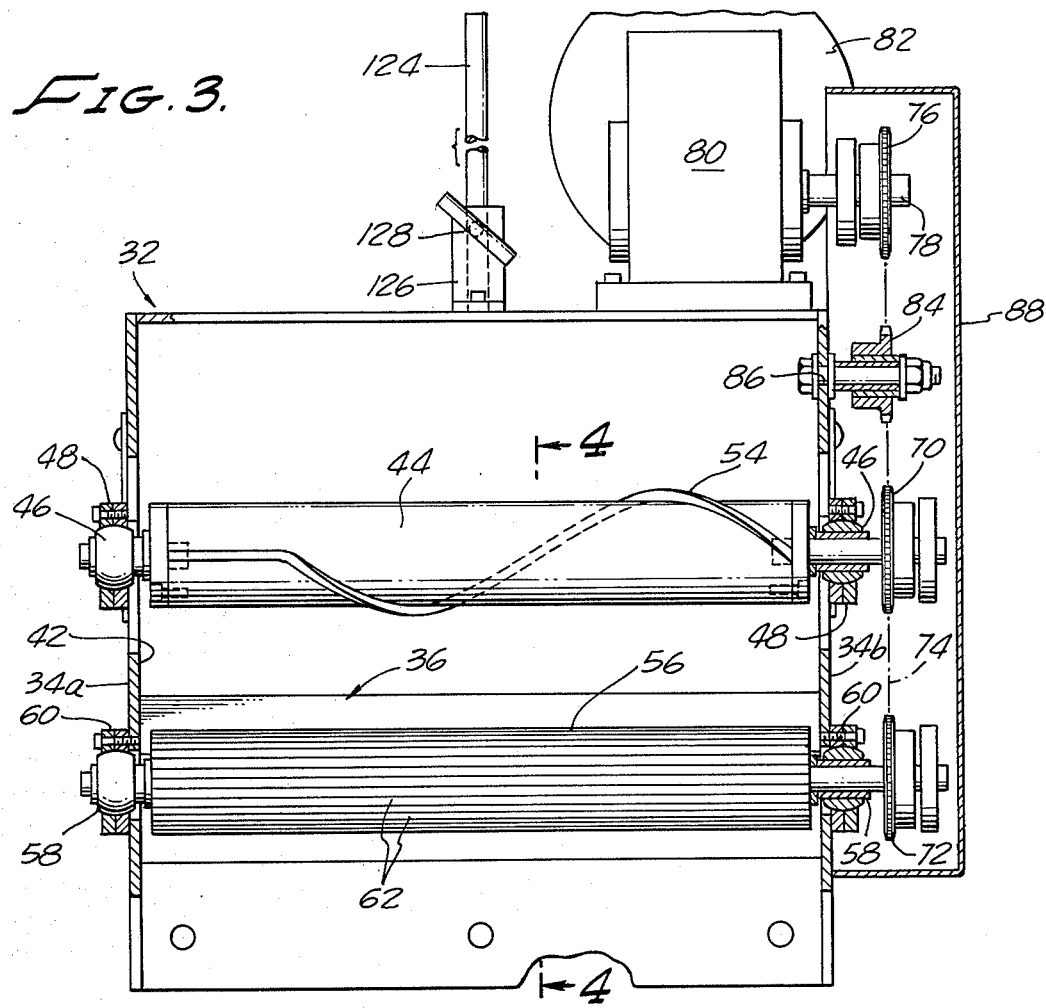
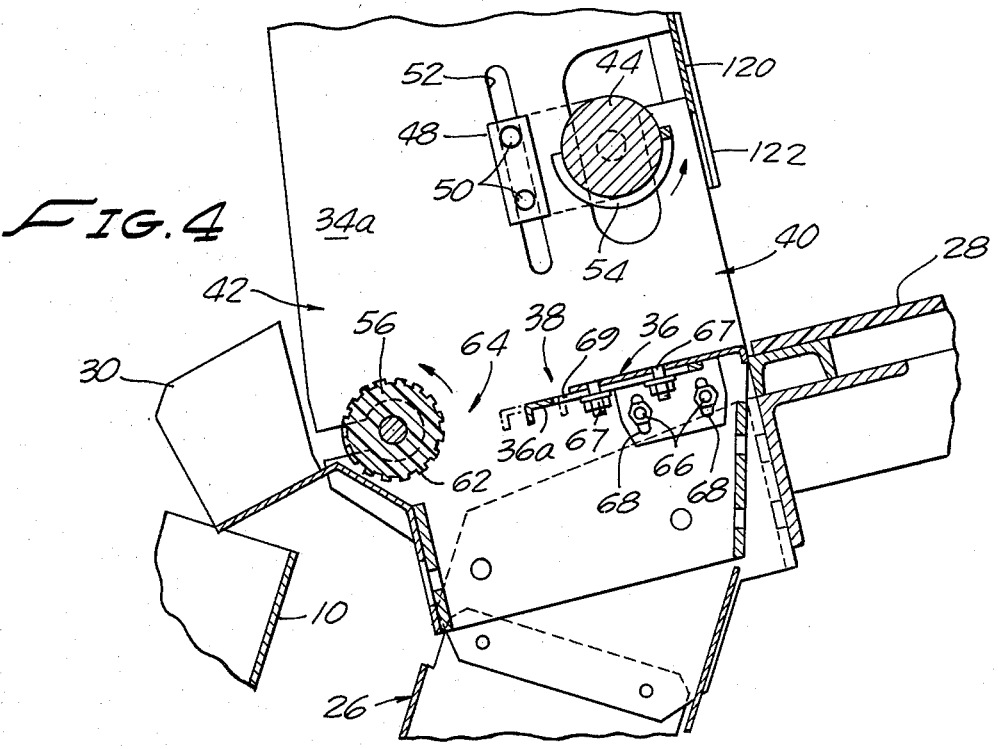

4,337,865

FEEDER MECHANISM FOR CONTROLLING DELIVERY OF FRUIT TO A JUICE EXTRACTOR

BACKGROUND OF THE INVENTION

The present invention relates generally to mechanisms for the feeding of objects in a feed path, and in particular to a mechanism such as utilized for the feeding of fruits to processing apparatus such as a juice extractor.

It is presently known in the industry to utilize citrus fruit juice extractors with rotary hoppers that have been designed and developed to improve the overall efficiency of the juice extracting process. Such rotary type hoppers are exemplified by U.S. Pat. No. 3,858,500, wherein the fruits are delivered to the hopper and stored in movable magazines from which they are successively delivered to the juice extracting instrumentalities. The operating efficiency of such hoppers and the juice extracting instrumentalities are in the main dependent upon a proper and suitable control of both the maximum and minimum sizes of the fruit delivered to the hopper or the juice extracting instrumentalities. For example:

1. If too much fruit is permitted to enter the hopper, its feed efficiency will be materially decreased because of the weight of the fruit, or the hopper may overflow.

2. Another important factor results from the possible entry of foreign or tramp materials along with the received fruits, and which may damage the feeder mechanism or the associated instrumentalities of the juice extracting apparatus.

3. Another important factor is concerned with the ability to control and limit the size of fruits admitted to the hopper, in order that oversized fruits too large to pass through the magazines or other restrictive openings will be eliminated.

4. Still another important factor is concerned with the ability to control the minimum fruit size that is fed to the fruit juice extracting instrumentalities. For example, in juice extractors of the cup type, if two undersized fruits enter a cup, one or both fruits may be smashed, or one fruit may simply drop into the juice without having its juice extracted, and thus reduce the juice quality.

The present invention therefore seeks to provide an improved fruit feeder mechanism for controlling the supply and size of fruits delivered to a juice extractor, and in particular to an associated hopper of the rotary type wherein fruits are stored in magazines and successively delivered from the magazines to the juice extractor, and wherein the feeder mechanism is designed to fully encompass the above noted factors and considerations, to the end that a maximum operating efficiency may be maintained during long and highly productive periods of operation.

SUMMARY OF THE INVENTION

Having in mind the inadequacies of the heretofore known feeder mechanisms, as previously noted, the present invention is in particular concerned with the provision of a novel and unique fruit feeder mechanism for controlling the supply and size of fruits to be delivered to a fruit juice extractor, and especially where the fruits for the juice extractor are fed via an associated hopper of the rotating type.

Accordingly, it is one object of the herein described invention to provide a feeder mechanism for objects, which includes components capable of limiting the maximum size of the objects to be delivered, and wherein the components may be activated and deactivated in response to a remotely sensed condition to control the rate of delivery of the objects by the feeder mechanism.

A further object is to provide an improved fruit feeder mechanism for controlling the size and rate of feed of fruit from a supply source to a rotary type hopper from which the fruits are in turn delivered to an operatively associated fruit processing apparatus, such as a juice extractor.

A further object is to provide a fruit feeder mechanism in which fruit from a supply source is admitted to a feed path by a rotatable gating roll, which limits the fruit to a predetermined maximum size, and a feed roll that is utilized to move fruit from the feed path to a delivery path which may or may not include a rotary hopper, and in which fruit level sensing means on the hopper is operative to continue operation of the feeder mechanism as long as a predetermined normal fruit level is maintained in the hopper, but which will stop the operation of the rolls and further delivery of fruit to the hopper, when the fruit level exceeds a predetermined level.

Another object is to provide a feeder mechanism according to the previous object, in which a size adjustable discharge opening is provided in the feed path for the removal of fruit of a size less than a predetermined minimum size, and for the removal of foreign or tramp materials, which may have been supplied inadvertently along with the fruits.

Still another object resides in the provision of a feeder mechanism for a rotary type hopper of a juice extractor apparatus, in which a fruit level sensing device in the hopper is arranged to start and stop the feeder mechanism in a manner to substantially maintain a predetermined normal fruit level in the hopper.

Further objects and advantages of the invention will be brought out in the following part of the specification, wherein detailed description is for the purpose of fully disclosing a preferred embodiment of the invention without placing limitations thereon.

BRIEF DESCRIPTION OF THE DRAWINGS

Referring to the accompanying drawings, which are for illustrative purposes only:

FIG. 1 is a fragmentary side elevational view showing a feeder mechanism according to the present invention as being arranged to deliver fruits to a rotary hopper of a juice extractor, portions being shown in section;

FIG. 2 is an enlarged fragmentary side elevational view of the feeder mechanism, portions being cut away to disclose the driving interconnections between the fruit gating and feeding components;

FIG. 3 is a fragmentary transverse section, taken substantially on line 3—3 of FIG. 2;

FIG. 4 is an enlarged fragmentary sectional view, taken substantially on line 4—4 of FIG. 3, and showing the operative relationship of the gating roll and feed roll in the feed path of the fruits;

DESCRIPTION OF THE PREFERRED EMBODIMENT

Figure 5:
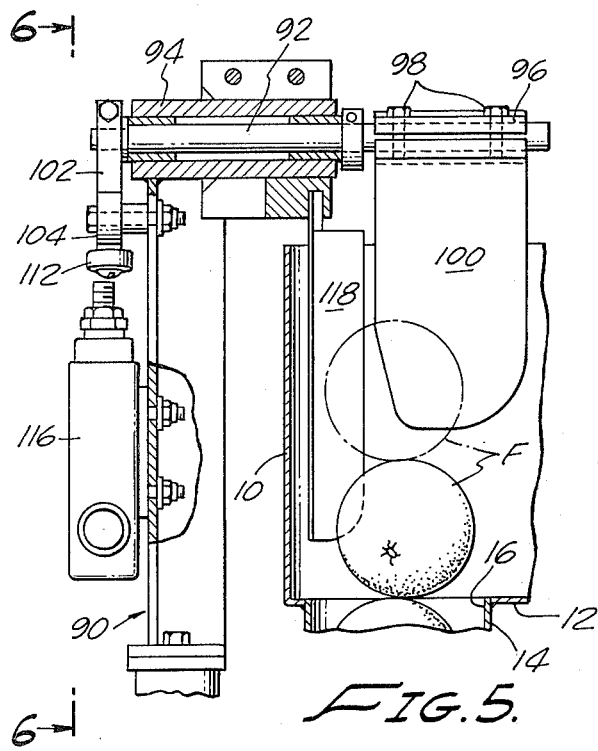
FIG. 5 is an enlarged fragmentary sectional view, taken substantially on line 5—5 of FIG. 1, and showing details of the fruit level sensing control means of the rotary hopper.

Referring more specifically to the drawings, for illustrative purposes, the feeder mechanism according to the present invention, as generally indicated at A in FIG. 1, is shown as being operatively applied to a rotary hopper, as generally indicated at B, and from which fruits are successively delivered to a juice extractor, as generally indicated at C.

The rotary hopper B is of a conventionally known type and as such forms no part of the present invention. Its disclosure herein is to exemplify generally structural features common to hoppers of the rotary type and which operate in a basic manner that will be greatly improved and augmented by means of the feeder mechanism of the present invention. The illustrated rotary hopper forms the subject matter of a pending application of Olav Berge, Ser. No. 138,131, filed Apr. 7, 1980, now U.S. Pat. No. 4,306,649, and which is incorporated herein by reference.

Briefly, the rotary hopper arrangement comprises a circular hopper 10 which is open at its top and has a bottom wall 12 which peripherally supports a plurality of circumferentially spaced depending tubular magazines 14, each of these magazines being in communication at its upper end with the hopper through a wall opening 16 by means of which fruit delivered to the hopper may be distributed to the magazines for storage and release in timed relation to the rotation of the hopper, by appropriate gating fingers 18a and 18b at the lower end portions of each magazine.

As will be seen, the hopper 10 is supported upon a suitable frame structure 20 in a position generally above the juice extractor C, and arranged to be rotatively driven from a power driven shaft 22, adapted for connection with a suitable power source.

As shown, the axis of rotation of the hopper is inclined from the vertical, and oriented with respect to the juice extractor in a manner such that, as the hopper is rotated, the gating fingers 18a, 18b will be actuated in a manner to successively discharge fruit from the magazines at a predetermined point of rotation such that the discharged fruit will be delivered through a fruit entrance opening 24 of the juice extractor. In a hopper of this type, it will be appreciated that, since each magazine provides a tubular passage of finite diameter, it becomes an important consideration that fruit which is delivered into the hopper shall be of a size no greater than that which will properly pass through the magazines, or allow fruit of excessively small size to enter the juice extractor. On the other hand, if a large fruit were delivered to the hopper it could become jammed or otherwise seriously affect the continued operation and effective delivery of fruit to the fruit juice extractor. Also, if the delivery of fruit to the hopper should be too great, the operation of the hopper could be seriously affected and even could cause an overflow of fruit.

As generally shown in FIG. 1, the feeder mechanism A of the present invention is mounted upon an appropriate frame supporting structure 26 at a position adjacent the lowest point of the inclined hopper circumference. The feeder mechanism in this position is adjacent a conveyor belt 28 of conventional construction, which is adapted to convey fruits F from a suitable source to the feeder mechanism A. The conveyor belt is preferably inclined so that the fruit will gravitationally move from the belt into the inlet of the feeder mechanism, and from which fruit will be discharged as by a suitable chute 30 into the associated hopper 10.

Referring more specifically to FIGS. 3 and 4, the feeder mechanism of the present invention is contained within a housing structure, as generally indicated at 32, which is fabricated with spaced parallel side walls 34a and 34b. Mounted in the lower portion of the housing is a dead-plate, as generally indicated at 36, which extends between the side walls and forms a surface within the housing for supporting movement of fruit in a feed path, as generally indicated at 38, which extends from an entrance opening 40 at its inlet end, and an outlet opening 42 at its discharge end for passage of the fruit from the feed path to a delivery path leading to the fruit entrance opening 24 of the juice extractor apparatus. In the disclosed embodiment, it will be seen that this delivery path includes the rotary hopper 10.

Within the housing, adjacent the entrance opening 40, a gating roll 44 is supported in an elevated position above the dead-plate 36 for coaction therewith to form a gate passage for limiting the maximum size of fruit admitted to the feed path from the conveyor 28. The roll 44 is rotatably supported at its respective ends in suitable bearings 46 which are respectively carried by adjustable bearings supporting brackets 48 which are retained by attaching bolts 50 arranged for movement longitudinally of a slot 52 formed in the adjacent side wall. As thus arranged, the gating roll 44 may be adjustably moved towards and away from the dead-plate 36 in a manner to permit variations in the size of fruit to be admitted.

In addition to the function of the gating roll 44 to determine the size of the admitted fruit, this roll is also provided with a surface configuration which will function to move fruit, which are too large to enter the gating opening, in a direction longitudinally of the gating roll and in a direction out of the opening 40, so as not to impede the entrance of other fruits from the conveyor. For this purpose, the roll 44 is in this case provided with a longitudinally extending spiralled projecting rib 54.

A feed roll 56 is mounted at the outlet end of the feed path inwardly adjacent to the outlet opening 42. This roll in a similar manner has its opposite ends rotatably supported in appropriate bearings 58 in bearing supporting brackets 60 which are respectively attached to the associated housing side wall.

The feed roll 56 is preferably formed of a resilient material and provided with a surface configuration in the form of circumferentially spaced longitudinally extending ribs 62. As shown in FIG. 4, the upper peripheral portion of the feed roll 56 extends above the plane of the dead-plate 36, so that when the roll is engaged by a fruit, the rotating roll will tend to lift the fruit and propel it from the feed path over the roll and into the delivery path.

Moreover, it will be seen that the feed roll 56 is laterally spaced from the adjacent end of the dead-plate 36 in a manner to provide a transversely extending opening 64 that is positioned between the gating roll 44 and the feed roll 56 for the passage of fruits of a size less than a predetermined minimum size, as well as any unwanted foreign materials or objects which may be supplied inadvertently along with the fruits, and which if carried into the hopper or the juice extracting apparatus could result in serious damage to the equipment. The dead-plate 36 is fabricated with end flanges which are respectively removably attached to the side walls 34a and 34b as by retaining bolts 66 which are positioned in adjusting slots 68 which also provide for raising and lowering adjustments of the position of the dead-plate 36.

Provision is also made for adjustably varying the width of the opening 64 between the feed roll 56 and the dead-plate 36 in a manner to provide a discharge opening which will discharge any fruit in the feed path of a size less than a minimum size as determined by the adjusted width of the opening 64. For such purpose, the dead-plate 36 adjustably mounts an extension plate portion 36a by means of retaining bolts 67 which are appropriately positioned in one or more adjusting slots 69 permitting movement of the plate portion 36a towards and away from the feed roll 56.

As shown in FIGS. 2 and 3, the gating roll 44 is connected with a drive sprocket 70, and the feed roll 56 is connected with a drive sprocket 72, these sprockets having tooth engagement with a common driving sprocket chain 74 that is trained over a drive sprocket 76 on the output shaft 78 of a speed reduction gear box 80 operatively connected with a drive motor 82. For adjustably maintaining tension on the sprocket chain 74, and for compensating for changes in the adjusted position of the gating roll 44 and its connected drive sprocket 70, an adjustable idler sprocket 84 is mounted for movement to adjusted positions along an associated mounting slot 86 formed in the side wall 34b. With the driving arrangement as explained above, it will be noted that the direction of rotation of the roll 44 and roll 56 will be in the same direction, namely, a counterclockwise direction as viewed in FIG. 4. As a safety provision, the sprocket chain 74 and the associated sprockets for driving the gating roll 44 and the feed roll 46, are normally concealed by a removable cover 88.

Figure 6:
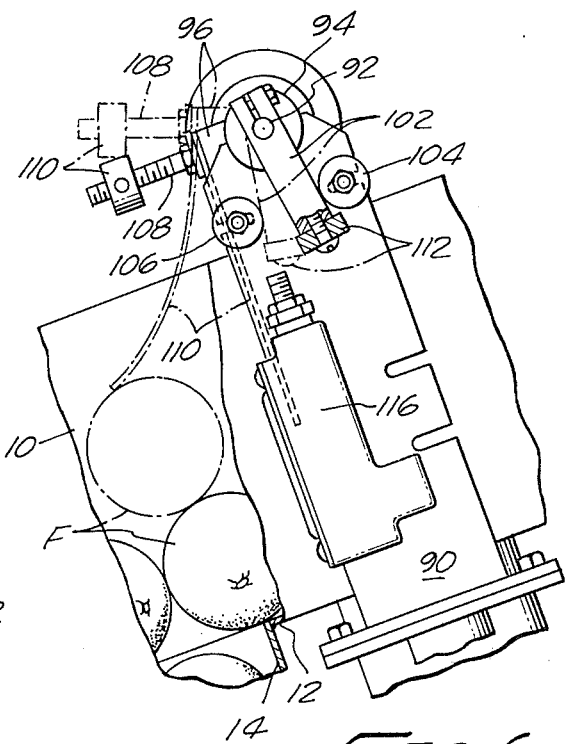
FIG. 6 is a fragmentary side elevational view of the switching means of the sensing control, as seen substantially along line 6—6 of FIG. 5, and illustrating the switch operation as a result of increased fruit level in the hopper.

When the feeder mechanism of the present invention is utilized to deliver fruit to a delivery path which includes a hopper of the rotary type, as exemplified at B in FIG. 1, provision is made for sensing the fruit level in the hopper as a part of a control arrangement for starting and stopping the feeding operation of the feeder mechanism A so as to maintain a substantially normal operating level of fruit in the hopper, and prevent the establishment of conditions which could result in overloading or overflow of fruit in the hopper. In such case, the sensing control is disclosed as embodying control means as best illustrated in FIGS. 5 and 6. For such purpose, a frame support 90 is positioned on the diametrically opposite side of the hopper from the magazine-discharge point, and at a position substantially 270° in the direction of rotation of the hopper from the point at which the fruits are delivered to the hopper from the feeder mechanism A.

More specifically, a rocker shaft 92 is supported in a bearing structure 94. The innermost end of the shaft 92 carries a radially extending bracket arm 96 which is clampingly secured at its inner end by bolts 98. This arm provides a support for a depending axially offset downwardly extending paddle 100 of flexible steel or other suitable material, and of a length to normally extend in a substantially right angle direction to the plane of the bottom wall 12 of the hopper. The lowermost end of this paddle is such that under normal operating conditions and with a normal layer of fruit in the hopper, this paddle will remain in its normal position. However, if the fruit level is increased, the paddle will be angularly deflected by fruit in an upper layer into an angularly displaced position as indicated in phantom lines, FIG. 6. This movement of the paddle 100 will effect rotation of the shaft 92 and swing a radial arm 102, which is clampingly secured to the outer end of the shaft 92, from a normal position against a stop member 104, as shown in full lines, to a position shown in phantom lines in which the arm 102 will be in engagement with a stop member 106. The bracket arm 96 carries a projecting threaded extension 108 at its outermost end for threadedly receiving an adjusting counterweight 110 which permits adjustment of an appropriate biasing action to normally maintain the radial arm 102 in engagement with the stop 104.

The outermost end of the arm 102 mounts a permanent magnet 112 which is adapted, upon swinging movement of the arm 102 into the position against stop 106, to actuate normally open contacts 114 of an associated reed switch 116 into closed position.

An angular deflector 118 is also supported from the upper end of the bearing support and extends downwardly along the peripheral wall of the hopper 10 in a position to inwardly deflect fruit at the periphery of the hopper so that it will have a path of movement susceptible of being intercepted by the paddle 100. Closure of the contacts 114 of the reed switch 116 is utilized to activate a control system, as will hereinafter be described in detail, which will operate to de-energize the drive motor 82 for a predetermined time delay interval sufficient to permit re-establishment of a normal fruit level within the hopper 10.

Referring to FIG. 2, provision is made also for cutting off flow of fruit from the conveyor 28 to the feeder mechanism A during cleanup periods. For this purpose, a closure panel 120 is slidably supported for raising and lowering movements in a pair of slide brackets 122 associated with its opposite edges. In its lowered position, the panel extends over the entrance opening 40, as shown in phantom lines. During normal feed operation, the closure panel 120 may be releasably secured in a raised position by means of a top rod member 124 which is axially slidable within the bore of a tubular guide 126. The closure panel 120 may be releasably retained in any desired degree of closure or opening by means of a manually operable clamping screw 128.

Figure 7:
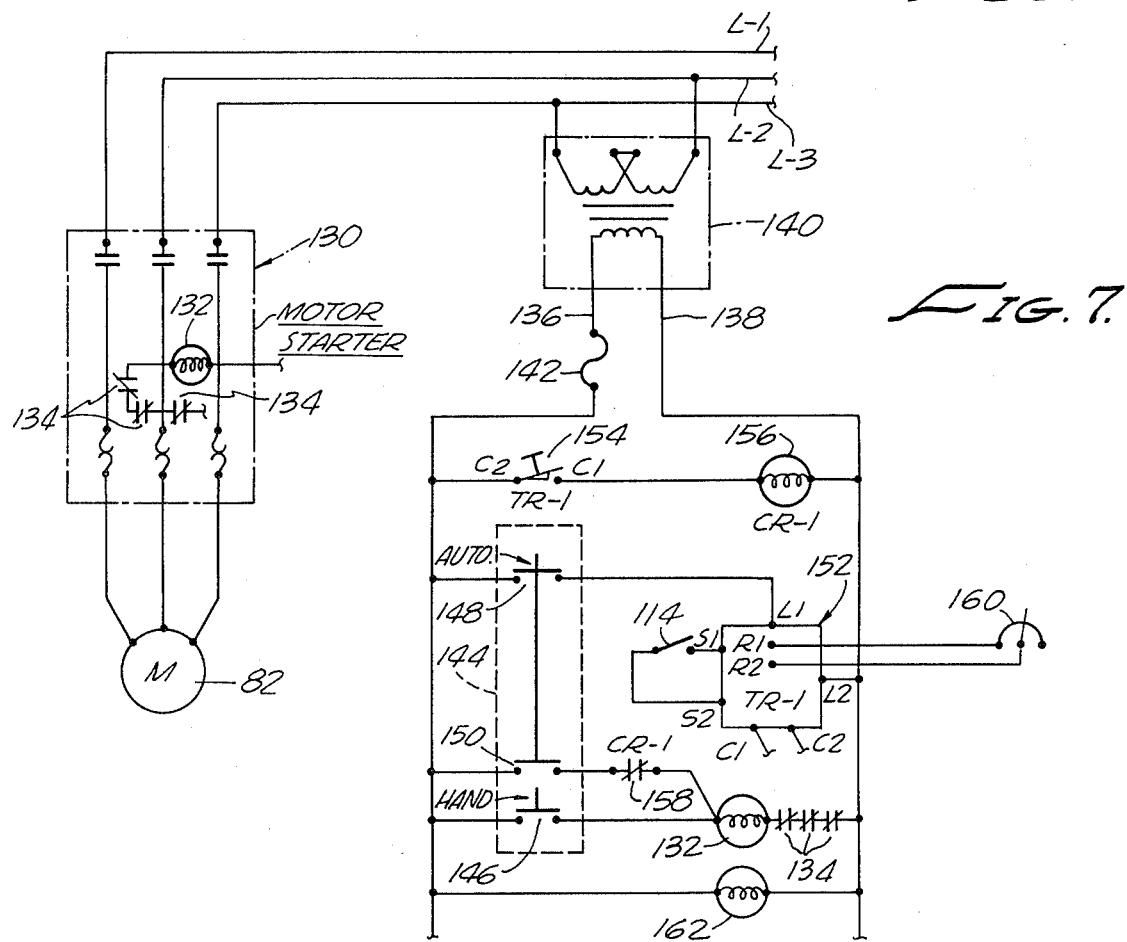
FIG. 7 is a schematic diagram of the control for controlling the operation of the feeder mechanism of the present invention.

The control circuitry for the drive motor 82 is schematically shown in FIG. 7. A typical drive motor would be of the order of ⅓ HP having a gear reduction speed of 350 RPM, and designed for 230/460 volt, three phase, 60 HZ operation. As shown, the motor 82 is connected with the three phase supply conductors L-1, L-2 and L-3. Starting and stopping of the motor is controlled by a conventional full voltage motor starter 130 which contains a built-in starting coil 132 and overload normally closed contacts 134.

The control components are operably connected with the conductors 136 and 138 which form a single phase 115 volt control circuit which is obtained from a step-down transformer 140 having its input connected to one phase of the three phase supply line. A protective fuse 142 is connected in the conductor 136.

The control is arranged to selectively provide for "HAND" and "AUTOMATIC" modes of operation. The hand controlled operation of the motor 82 overrides the automatic operating mode and is utilized during cleanup operations and at other times when the feeder mechanism is not performing its usual function. The automatic mode is utilized during normal use of the feeder mechanism, and when the maintenance of fruit level in the hopper becomes an important factor. For this purpose, a mode selector switch 144 is provided with normally open contacts 146 which are manually closable to complete an energizing circuit with the starting coil 132 of the motor starter. Opening of the contacts 146 will stop the motor operation. For operation in the automatic mode, a set of contacts 148 and a set of contacts 150 are provided for the control of separate circuits, these contacts being manually closable and interconnected for unitary actuation.

In the automatic control mode, a timing relay TR-1, as indicated by the numeral 152, is utilized for initiating stoppage of the operation of motor 82 in response to closure of the reed switch contacts 114 and for providing a predetermined time interval before restarting the motor 82. The relay input terminal L-1 is connected through the contacts 148 to the conductor 136 of the control circuit, while input terminal L-2 is connected with the conductor 138 of the control circuit. Operation of this relay is initiated by closure of the contacts 114 of the reed switch, these contacts being connected between the terminals S-1 and S-2. The relay also contains normally open contacts 154 which are connected between output terminals C-1 and C-2. The contacts 154 are positioned in the energizing circuit of an actuating coil 156 of a control relay CR-1, this relay having normally closed contacts 158 which are in series with the switch contacts 150 of a connection from the starting coil 132 to the conductor 136. Time delay restart of the motor 82 after a shut-down, is adjustable by means of a potentiometer 160 having its terminal connections connected to the terminal connections R-1, R-2 of the relay 152. This potentiometer permits a variation of the restart time interval of from substantially 7 to 12 seconds.

A clock 162 is operatively connected between the conductors 136 and 138, this clock being operative to record the operating time of the installation.

When it is desired to operate the installation in the automatic mode, switch contacts 148 and 150 are manually actuated to a closed position. Contacts 148 operate to establish an energizing connection for the timing relay 152, and contacts 150 complete an energizing circuit to the starting coil 132 of the motor starter 130. The feeder control mechanism A will now function and continue to run until the fruit level in the hopper increases to such an extent as to actuate the contacts 114 of the reed switch 116. Closure of the contacts 114 operates to initiate the time delay restart period and at the same time close its contacts 154 to energize the actuating coil 156 of the CR-1 control relay, whereupon this relay will open its contacts 158 so as to de-energize the starting coil 132 of the motor starter and thereby stop the operation of the motor 82. At the end of the delay period, as determined by the setting of the potentiometer 160, the timing relay 152 will open its contacts 154 and thus de-energize the control coil 156 to cause a closure of its contacts 158 and energization of the starting coil 132 to start the motor 82. The potentiometer 160 is adjusted to an appropriate interval to allow the hopper to partially empty and so that 100% feed of fruit into the hopper can be maintained without overflowing.

From the foregoing description and drawings, it will be clearly evident that the delineated objects and features of the present invention will be accomplished.

Various modifications may suggest themselves to those skilled in the art without departing from the spirit of the disclosed invention and, hence, it is not wished to be restricted to the specific forms shown or uses mentioned, except to the extent indicated in the appended claims.

What is claimed is:

1. Feeder mechanism for controlling the delivery of fruits from a supply source to a juice extractor for processing therein, which comprises:
    means providing a feed path having an inlet end adapted to receive fruits from said supply source, and an outlet end adapted for connection with a delivery path for conducting the fruits to the juice extractor;
    gating means at the inlet end of said feed path operative to admit to the feed path fruits that do not exceed a predetermined size; and
    means at the outlet end of said feed path movably operable to impel fruits from the feed path to the delivery path, and upon cessation of its movement being operable to provide a fruit retaining stop abutment between the feed path and the delivery path.

2. Feeder mechanism according to claim 1, in which:
    means provides an opening in the feed path between the gating means and the means at said outlet end, for the discharge of foreign materials and objects which may be supplied inadvertently along with the fruits.

3. Feeder mechanism according to claim 2, in which:
    said opening is size adjustable in a direction longitudinally of said feed path to discharge fruit of a size less than that determined by the adjusted size of said opening.

4. Feeder mechanism according to claim 1, in which:
    the gating means at the inlet end of said feed path comprises an elevated roll that extends substantially transversely of said feed path.

5. Feeder mechanism according to claim 4, in which:
    the elevated position of said roll is adjustable to vary the gated fruit size.

6. Feeder mechanism according to claim 4, in which:
    the gating roll has a surface configuration operative to propel fruits that exceed said predetermined size, in a direction generally longitudinally of said roll.

7. Feeder mechanism according to claim 6, in which:
    the surface configuration of the gating roll includes a spiralled projecting rib.

8. Feeder mechanism according to claim 4, which includes:
    a manually operable closure member for closing the inlet end of the feed path to prevent feeding fruits from said source during cleaning operations.

9. Feeder mechanism according to claim 1, in which:
    the means at said outlet end comprises an elongate rotatable roll.

10. Feeder mechanism according to claim 9, in which:
    said roll is formed of a resilient material and is provided with a surface configuration for engaging and lifting fruits from the feed path to the delivery path.

11. Feeder mechanism according to claim 10, in which:
    the surface configuration includes circumferentially spaced longitudinally extending ribs.

12. Feeder mechanism according to claim 1, in which:
the delivery path includes a hopper adapted to receive fruit from the outlet end of said feed path and deliver fruit to the juice extractor through an opening of a size to pass fruits of a size equal to or less than said predetermined size.

13. Feeder mechanism according to claim 12, in which:
control means in said hopper is responsive to an abnormal accumulation of fruits in the hopper, and operative to interrupt the delivery of fruits to the hopper until normal conditions in the hopper are restored.

14. Feeder mechanism according to claim 12, in which:
the hopper is of the rotary type having a plurality of magazines for storage of fruits, and from which the fruits are successively delivered from the magazines to the juice extractor.

15. Feeder mechanism according to claim 14, in which:
the gating means comprises an elevated rotatably mounted roll;
the means at said outlet end comprises a rotatably mounted feed roll;
a power source is drivingly connected with said rolls, said power source having an energizing circuit; and
control means including a manually operable switch is selectively operable to open and close said energizing circuit.

16. Feeder mechanism according to claim 14, in which:
the gating means comprises an elevated rotatably mounted roll;
the means at said outlet end comprises a rotatably mounted feed roll;
a power source connected with said rolls is energizable to actuate said rolls; and
control means, including sensing means, responsive to variations in the level of fruits in the hopper, are operative at a predetermined normal fruit level to energize said power source and actuate said rolls, and at a predetermined increased fruit level to de-energize said power source and stop the operation of said rolls.

17. Feeder mechanism according to claim 16, in which: the sensing means comprises:
a fruit sensing arm pivoted at one end for swinging movement from a normal position in which its other end is positioned above the normal fruit level, and to an angularly displaced position when engaged by fruit at the predetermined increased fruit level; and
circuit controlling switch contacts actuated to opened and closed positions according to said positions respectively of said sensing arm.

18. Feeder mechanism according to claim 17, in which:
the circuit controlling switch contacts comprise a switch of the reed type; and
a magnet connected with said sensing arm is movable into and out of a position for changing the switch contacts from one operating mode to another.

19. Feeder mechanism according to claim 16, in which:
the control means includes time delay means for re-energizing said power source after a predetermined time interval following its de-energization.

20. A feeder mechanism for feeding objects, comprising:
a housing structure including an elongate surface which forms a support for feeding movement of objects along a feed path from an inlet end to an outlet end;
a rotatable gating roll at the inlet end extending transversely of the feed path, and being supported in an elevated position above the underlying support surface to form therewith a size gating admission opening for the objects; and
a rotatable feed roll adjacent the outlet end longitudinally extending transversely of the feed path and having an upper longitudinal portion projecting above the support surface, said feed roll during non-rotation forming an abutment for opposing movement of objects from the feed path to a delivery path, and during rotation being operative to impel objects from the feed path to the delivery path.

21. A feeder mechanism according to claim 20, in which:
the feed roll is spaced from the adjacent end of said support surface to provide an exit opening for the discharge of objects of a size less than a predetermined size, and unwanted foreign materials admitted inadvertantly to the feed path along with the objects.

22. A feeder mechanism according to claim 20, in which:
a power source having an energizing circuit is drivingly connected with said rolls, and being operative to drive them in the same direction of rotation.

23. A feeder mechanism according to claim 22, in which:
control means including switching means are operable to close and open said energizing circuit in order to implement the rotation and non-rotation of said rolls.

24. A mechanism for the sizing and feeding of objects from a supply source to a delivery path, which comprises:
means providing a feed path for movement of objects from an inlet end adapted to receive objects of various sizes from said supply source, to an outlet end adapted for connection with said delivery path;
gating means at the inlet end of said feed path operative to admit objects to the feed path that do not exceed a predetermined maximum size;
an opening in said feed path for discharging objects having a size less than a minimum size as determined by said opening; and
means at the outlet end of said feed path for impelling the maximum sized and minimum sized objects from the feed path to said delivery path.

* * * * *